W. A. SORG.
COMBUSTION ENGINE.
APPLICATION FILED APR. 7, 1919.
1,383,577.
Patented July 5, 1921.
2 SHEETS—SHEET 1.
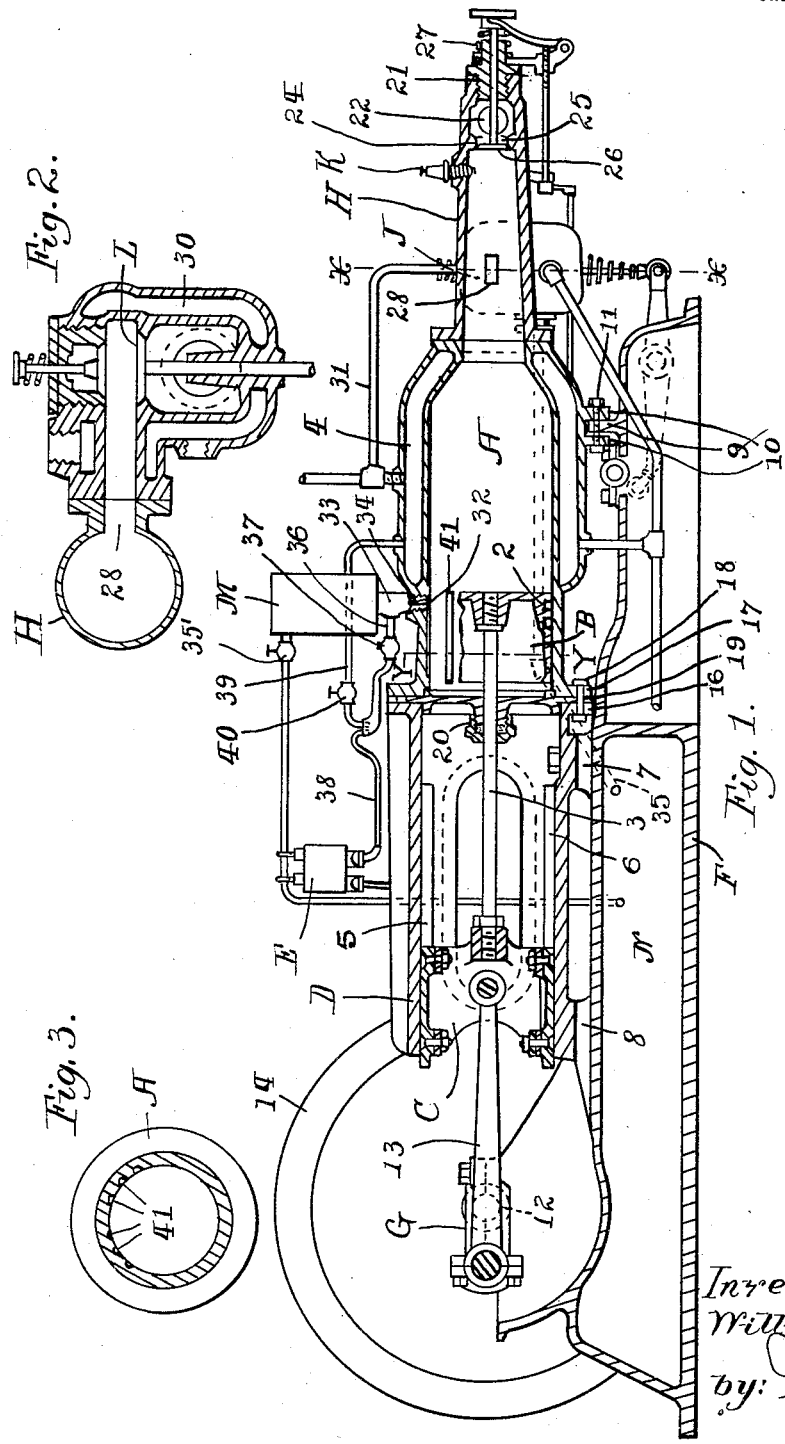
Inventor:
William A. Sorg,
by: F. S. Rodbury
Attorney.

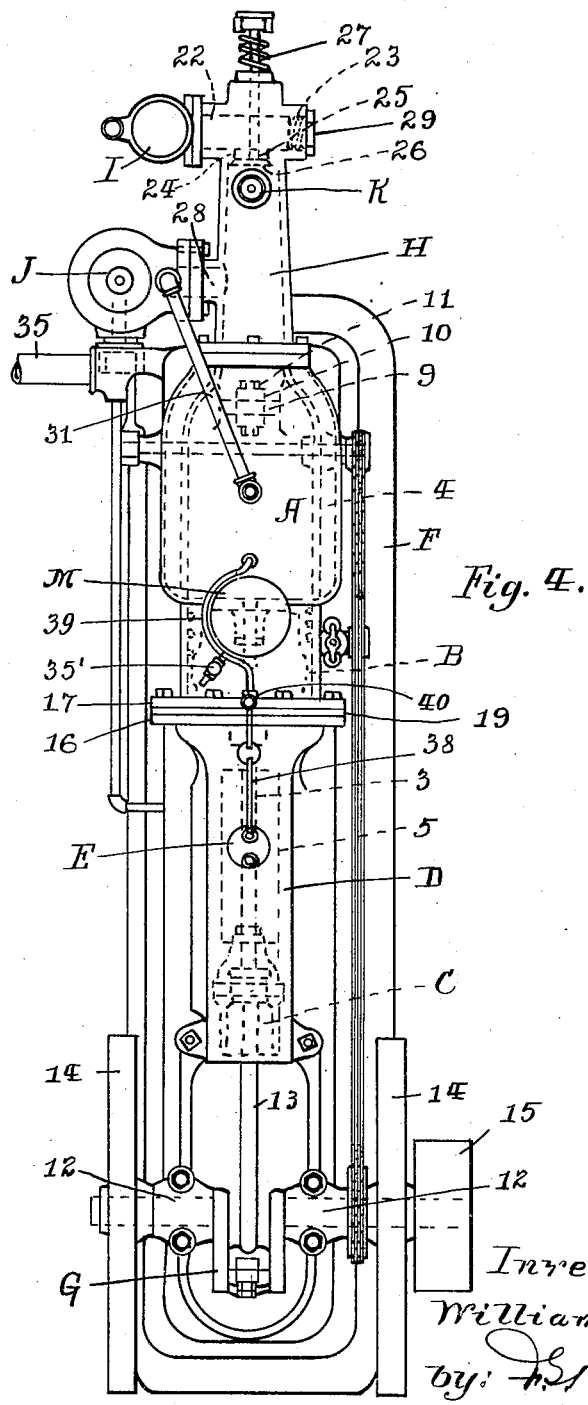

UNITED STATES PATENT OFFICE.

WILLIAM A. SORG, OF DENVER, COLORADO.

COMBUSTION-ENGINE.

1,383,577.          Specification of Letters Patent.          Patented July 5, 1921.

Application filed April 7, 1919. Serial No. 287,936.

*To all whom it may concern:*

Be it known that I, WILLIAM A. SORG, a citizen of the United States, residing at Denver, in the county of Denver and State of Colorado, have invented a new and useful Improvement in Combustion-Engines, of which the following is a specification.

This invention relates to combustion engines, the primary object being to develop power more efficiently from heavy fuel oil, such as kerosene and from gasolene, alcohol and other hydrocarbons, than heretofore, and wherein during the operation of the engine, precipitation and carbonization of particles of heavy liquid fuel upon the surface of the piston and its packing rings are prevented.

A further object is to cushion the piston at or near the end of its strokes, thereby reducing jar and vibration of the working parts, saving the bearings from excessive and uneven wear, and causing the engine to run more quietly. A still further object is to thoroughly vaporize the oil before it comes in contact with the machine surface of the cylinder thereby reducing oxidation of the oil. Another purpose of this construction is to provide means for effectively lubricating the piston and packing rings in a manner to avoid carbonization of the lubricating oil.

With these and further objects in view, my invention comprises the features of construction, and combination of parts hereinafter more particularly described and claimed.

In the accompanying drawings forming part of this specification, Figure 1 is a longitudinal section of my invention, Fig. 2 is a section of a detail taken upon the line X—X of Fig. 1; Fig. 3 is another section of a detail taken upon the line Y—Y of Fig. 1, and Fig. 4 is a plan of the structure illustrated in Fig. 1.

In the drawings, let A represent a cylinder constructed in accordance with my invention, and B the usual reciprocatory piston having the usual packing rings 2 in its periphery and being connected to a cross head C by a reciprocatory shaft 3, one end of which is threaded into the piston and the other end threaded into the cross head to tie the same together.

The cylinder A is formed with a water jacket 4 over a portion of its surface for cooling purposes, although it is contemplated that the cylinder may be of the usual air cooled type when desired, without the water jacket. Extending longitudinally from one end of the cylinder is a bearing or guide member D in which the cross head slides, a pair of oppositely disposed bearing surfaces 5 and 6 being provided between which the cross head slides, and said bearing surfaces being supplied with oil by the lubricator E.

F is the engine bed, which is formed with steps 7 and 8 upon which the cross head guide is mounted, and with a transversely disposed lug 9, to which the cylinder is secured by means of a pair of lugs 10 formed on the cylinder and a longitudinally disposed bolt 11 passing through the lugs 9 and 10. The space between the lugs 10 is greater than the width or thickness of the transverse lug 9, thus facilitating assembling of the parts of the engine with a minimum amount of machine work and allowing for expansion or contraction of the parts. G indicates a crank shaft, which is journaled in suitable bearings 12 provided on or in the base and connected by the pitman 13 with the cross head in the usual manner. Fly wheels 14 (see Fig. 4) and a drive pulley 15 are also provided on the crank shaft. The adjacent ends of the cross head guide D and of the cylinder A are joined by flanges 16 and 17 and bolts 18 passing therethrough, a closure plate or disk 19 being clamped between said flanges and serving to close tightly the outer end of the cylinder. A suitable gland 20 is centrally disposed on the closure member 19 through which the piston rod 3 slides freely without allowing any of the medium contained in the cylinder escaping through the joint between the connecting rod 3 and the closure member.

Secured in longitudinal position on the end of the cylinder opposite the head of the piston is a long tubular combustion chamber H, the bore of which is considerably less than the bore of the cylinder, and formed in the outer end of said tubular structure is an end opening 21 and a pair of side openings 22 and 23. A transverse partition 24 is also provided, which has a circular valve opening 25, upon which the fuel admission valve 26 is seated, said valve being urged upon its seat by a spring 27 around the valve stem. This valve is adapted to control the ingress of fuel mixture from the carbureter I, which is connected into the opening 22. The tubular combustion chamber is formed with a port 28 in its side with which a duct leading into an exhaust valve L leads. For cooling purposes the portion of the combustion chamber containing the exhaust valve L is formed with a water jacket 30. An air ingress valve J is placed above the exhaust valve which admits air into the exhaust valve chamber from whence it passes into the vaporizing tube sufficiently to prevent pre-ignition. Immediately ahead of the valve 26 in the combustion chamber is the spark plug K by which the fuel mixture contained in the tubular combustion chamber immediately ahead of the valve 26 is ignited. The exhaust valve is mechanically operated by any suitable mechanism desired in synchronism with the movement of the piston in the usual manner, while the fuel and air valves may either be mechanically operated or operated automatically by the suction of the engine on the intake stroke. The opening 23 may be closed by a removable stopper 29. The opening 23 is for gaining access to valve 26 when desired.

Water or other cooling medium is also admitted into the jackets 4 and 30 respectively surrounding the cylinder and the combustion chamber by the system of piping 31 leading from any suitable source of water supply not shown. Any suitable timer and governor may also be used with the apparatus to perform their usual functions.

In the wall of the cylinder and arranged to connect with the space back below the piston in the cylinder after the piston moves forwardly upon its exhaust or compression strokes, but adapted not to be uncovered by the piston to communicate with the space ahead of the piston when the piston reaches the end of either its suction or power strokes is a port 32, which leads from a large vacuum chamber M. This vacuum chamber is secured by the nipple 33 threaded into the wall of said port and having a small orifice 34 through which air, gas and oil from the lubricator E or other medium as will be hereinafter described are admitted into the cylinder and upon the bearing surface of the wall of the piston. A small amount of exhaust gas is taken from the exhaust pipe 35 and carried into the cooling chamber N formed in the base F where it is cooled and then taken to the vacuum chamber M through valve 35′ the amount of exhaust gas taken into the vacuum chamber M being much greater than the oil which is taken in through the inlet duct 36 hereinafter referred to. Leading into the passage in the nipple 33 is an inlet duct 36 for oil or water or both, said duct being provided with a check valve 37. A pipe 38 leading from the lubricator E and a pipe 39 from the water jacket 4 connect with the duct 36, said water supply pipe 39 being controlled by the valve 40. Thus when the piston B moves forwardly and uncovers the port 32, the gas and air in the vacuum chamber M and the oil from the lubricator E, and water when used, are drawn into the cylinder, being sprayed through the orifice 34 over its walls.

Arranged longitudinally in the cylinder wall are a plurality of channels 41 which extend from the closure 19 forwardly so that their forward ends are uncovered by the piston every time the piston reaches its outward stroke and form a connection from the space beyond or below the piston within the cylinder to the space ahead of the piston, thereby relieving the compression formed by the outward stroke of the piston after the piston has been cushioned sufficiently to prevent jar and uneven working of the moving parts. These channels admit the mixture of lubricating medium, inert gas and air (and water when used), which is sprayed upon the wall of the cylinder ahead of the piston and forms in a stratum over the head end of the piston to reduce the temperature of the piston and thoroughly lubricate the bearing surfaces. The cushioning effect thus produced and the releasing of the pressure ahead of the piston as described immediately before the crank is upon dead center causes the engine to run more quietly and reduces jar and vibration. By mixing with the exhaust gas and air, the lubricating medium is raised in temperature and is in prime condition to be sprayed, and thoroughly lubricate the working surfaces of the parts in the cylinder.

In operation the spent gas remaining in the clearance space of the engine is carried into the cylinder by the stream of air admitted by the air valve J and at the end of the stroke the inert gas, oil and air is injected around the piston head, while the richer fuel mixture remains in the vaporizing tube. At the end of the power stroke the inner ends of the channels 41 are opened and a portion of the compressed gases pass into the cylinder assisting the removal of the residue left from the previous stroke, while at the end of the suction stroke the same operation takes place, thereby diluting the charge near the piston head and preventing the oxidation of the lubricating oil.

By means of the arrangement described and shown, the contour of the interior of the combustion tube is substantially unbroken and represents a continuous even surface which will most effectively vaporize the fuel, the spent gases are exhausted by the tube immediately adjacent to the cylinder and air is admitted into the tube and cylinder ahead of the fuel, at a point which is most advantageous. As a result the tube is maintained at sufficient temperature to convert kerosene and other heavy fuel into gas and the inner surface of the tube is so cooled by the incoming air and fuel as to avoid pre-ignition.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

Having described my invention, what I claim as new and desire to protect by Letters Patent is:

1. A combustion engine, comprising, in combination, a cylinder, a piston in said cylinder, fuel and exhaust valves connected with said cylinder, a closed chamber on the outer end of said cylinder immediately below said piston, said cylinder having a small longitudinal channel in its inner surface connecting the spaces on both sides of said piston in said cylinder when the piston reaches the end of its power stroke, whereby a small amount of spent gas and lubricating medium are received from the space in said cylinder into said closed chamber at the end of said power stroke and spread over the inner end of said piston and the walls of said closed chamber to prevent precipitation and carbonization of particles of heavy liquid fuel by chilling.

2. A combustion engine, comprising, in combination, a cylinder closed on its outer end, a piston in said cylinder, said cylinder having a small longitudinal channel in its inner surface connecting the spaces on both sides of said piston in said cylinder only when the piston reaches the end of its power and intake strokes, and air, fuel and exhaust valves connected with said cylinder, for the purposes specified.

3. A combustion engine, comprising, in combination, a cylinder, a piston in said cylinder having a connecting rod, a closure over an end of said cylinder forming a chamber cushioning said piston and through which said rod slides, said cylinder being channeled in its inner surface to connect the space below with the space ahead of said piston in said cylinder by a small connection only when said piston reaches the outer end of its power and intake strokes, and means for admitting lubricating medium into said cylinder space to connect with the channel.

4. A combustion engine, comprising, in combination, a cylinder, a piston in said cylinder having a connecting rod, fuel and exhaust valves connected with said cylinder, a closure over an end of said cylinder immediately below said piston through which said rod slides, a suction chamber, a duct connected with said suction chamber and entering the space in said cylinder below said piston and a lubricator connected with said duct, said cylinder being channeled in its inner surface to connect the closed space below with the space ahead of said piston in said cylinder only when the piston reaches the extreme outer end of its power and suction strokes, whereby the piston is cushioned and the compression below is released near the outermost ends of its power and suction strokes and heated lubricating medium is spread over the contact surfaces between the sides of the cylinder and piston.

5. A combustion engine, comprising, in combination, a cylinder, a piston in said cylinder having a connecting rod, fuel and exhaust valves connected with said cylinder, a closure over an end of said cylinder immediately below said piston through which said rod slides, a suction chamber, a duct connected with said suction chamber and entering the space in said cylinder below said piston, said duct having an oil and water supply connection and said cylinder having a channel in its wall connecting the closed space below with the space ahead of said piston in said cylinder only when said piston reaches the end of its power and suction strokes.

6. A combustion engine, comprising, in combination, a cylinder, a piston in said cylinder, a tubular extension on said cylinder forming a combustion chamber, a valve near the outer end of said chamber to admit the fuel mixture, igniting means provided near one end of said chamber, an exhaust valve associated with said chamber for releasing the exhaust gases, and a closed auxiliary chamber over the outer end of said cylinder connected with the interior of the cylinder by a port which is uncovered by the piston only near the extreme end of its power and intake strokes, whereby the piston is cushioned near the ends of said power and intake strokes and a small portion of the cushioning medium is admitted into the cylinder ahead of the piston.

7. A combustion engine, comprising, in combination a cylinder having an exhaust outlet and a duct forming a connection between two portions of its interior, a piston in said cylinder opening said duct to form a communication between the space below and ahead of said piston when said piston reaches the end of its intake and power strokes, a base supporting said cylinder having a chamber into which a portion of the exhaust gases from said exhaust outlet are introduced and cooled, said chamber being connected with said duct to introduce part of said exhaust gases back into said cylinder.

In testimony whereof, I have signed my name to this specification.

WILLIAM A. SORG.